United States Patent
Lu et al.

(10) Patent No.: US 11,663,155 B2
(45) Date of Patent: May 30, 2023

(54) METHOD AND APPARATUS FOR REALIZING USB COMMUNICATION

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 133 days.

(21) Appl. No.: 17/478,829

(22) Filed: Sep. 17, 2021

(65) Prior Publication Data
US 2022/0004519 A1     Jan. 6, 2022

Related U.S. Application Data

(63) Continuation of application No. PCT/CN2020/127870, filed on Nov. 10, 2020.

(30) Foreign Application Priority Data

Nov. 11, 2019    (CN) .......................... 201911092405.1

(51) Int. Cl.
G06F 13/42      (2006.01)

(52) U.S. Cl.
CPC ................... *G06F 13/4282* (2013.01); *G06F 2213/0042* (2013.01)

(58) Field of Classification Search
None
See application file for complete search history.

(56) References Cited

U.S. PATENT DOCUMENTS

| 7,660,611 | B1 | 2/2010 | Asbury |
| 2009/0248907 | A1 | 10/2009 | Huang |

(Continued)

FOREIGN PATENT DOCUMENTS

| CN | 1955890 A | 5/2007 |
| CN | 102012886 A | 4/2011 |

(Continued)

OTHER PUBLICATIONS

Supplementary Search Report of the priority application CN201911092405.1.

(Continued)

*Primary Examiner* — Henry Tsai
*Assistant Examiner* — Dean Phan
(74) *Attorney, Agent, or Firm* — J.C. Patents

(57) ABSTRACT

The disclosure provides a method and an apparatus for realizing USB communication; the method includes: step S1, when receiving a command sent by a host computer, a device determines a type of the command and returns enumerated general information of the device to the host computer if the command is an enumerating command, go back to step S1; if the command is a setting report command, the device acquires response data according to the setting report command and stores the response data, go back to step S1; if the command is a getting report command, the device selects a corresponding report size according to a size of current response data, acquires a second report identification corresponding to the report size, generates return data according to the acquired second report identification and the current response data and sends the return data to the host computer, go back to step S1.

16 Claims, 4 Drawing Sheets

(56) References Cited

U.S. PATENT DOCUMENTS

| | | |
|---|---|---|
| 2010/0042763 A1 | 2/2010 | Bica |
| 2013/0067455 A1* | 3/2013 | Miao ..................... G06F 8/654 |
| | | 717/173 |
| 2018/0091509 A1* | 3/2018 | Lu ......................... H04L 9/3268 |
| 2018/0288158 A1* | 10/2018 | Nolan ..................... H04L 67/12 |

FOREIGN PATENT DOCUMENTS

| | | |
|---|---|---|
| CN | 102638397 A | 8/2012 |
| CN | 106406967 A | 2/2017 |
| CN | 110830168 A | 2/2020 |

OTHER PUBLICATIONS

International Search Report of PCT/CN2020/127870.
NPL: "Research and Implementation of Infrared Touch Screen Based on HID Class", by Yun Wang, Master Thesis, Apr. 1, 2014 Anhui University, CN.
First Office Action of the priority application CN2019110924051.

\* cited by examiner

METHOD AND APPARATUS FOR REALIZING USB COMMUNICATION

CROSS-REFERENCE TO RELATED APPLICATIONS

This application is a continuation of International Application No. PCT/CN2020/127870, filed on Nov. 10, 2020, which claims priority to Chinese Patent Application No. 201911092405.1, filed on Nov. 11, 2019, both of the applications are hereby incorporated by reference in their entireties.

TECHNICAL FIELD

The present disclosure relates to the field of electronic products and, in particular, to a method and an apparatus for realizing USB communication.

BACKGROUND

USB Human Interface Devices (HID) belong to devices for human-machine interaction, which are a big category and used in some aspects for controlling computer operating, such as USB mice, USB keyboards, USB joysticks, USB touch panels, USB track balls, call dialing devices, VCR remote controllers, and the like. The communication among USB HID devices is realized according to the Human Interface Device protocol. In prior art, a size of a package in one interaction in the HID communication protocol is fixed. Therefore, when a size of data to be sent is greater than the fixed size of the packet, the data is distributed into many packages and multiple interactions are executed so as to complete the sending of the data, thus leading to a low communication speed.

SUMMARY

In order to solve the shortcomings in the prior art, the present disclosure provides a method and an apparatus for realizing USB communication.

The present disclosure provides a method for realizing USB communication, includes:

step S1, when a device receives a command sent by a host computer, determining, by the device, a type of the command, if the command is an enumerating command, executing step S2, if the command is a setting report command, executing step S3; if the command is a getting report command, executing step S4;

step S2, returning, by the device, enumerated general information of the device, going back to step S1; the general information of the device including a report descriptor, the report descriptor including a plurality of features, each feature includes a report identification and a corresponding report size;

step S3, acquiring, by the device, response data according to the setting report command and storing the response data, going back to step S1;

step S4, selecting, by the device, a corresponding report size according to a size of current response data, acquiring a second report identification corresponding to the report size, generating return data according to the acquired second report identification and the current response data and sending the return data to the host computer, going back to step S1.

Further, step S2 includes:

when the device receives a getting status request sent by the host computer, returning, by the device, device status information to the host computer;

when the device receives a getting device descriptor command sent by the host computer, returning, by the device, corresponding data according to an acquired data size in the getting device descriptor command; the corresponding data returned being response data of a maximum data package size supported by a current signal pathway or a complete device descriptor;

when the device receives a setting address request sent by the host computer, storing, by the device, a new address in the setting address request and returning a confirming response to the host computer;

when the device receives a getting device configuration descriptor command sent by the host computer, sending, by the device, complete configuration information to the host computer;

when the device receives a getting device string descriptor command sent by the host computer, sending, by the device, a descriptor character set to the host computer;

when the device receives a getting human interface device descriptor command from the host computer, returning, by the device, a human interface device descriptor to the host computer;

when the device receives a getting report descriptor command sent by the host computer, returning, by the device, a report descriptor to the host computer; the report descriptor including a plurality of features, each feature including a report identification and a corresponding report size; and when the device receives a setting configuration command sent by the host computer, configuring, by the device, the device.

Further, when the device receives a getting device configuration descriptor command sent by the host computer, sending, by the device, complete configuration information to the host computer includes:

after the device receives the getting device configuration descriptor command every time, sending, by the device, corresponding configuration information to the host computer.

Further, step S4 includes:

selecting, by the device, a report size which is greater than and most approximate to the current response data according to the current response data, acquiring a second feature including the report size in the report descriptor, acquiring a second report identification in the second feature, connecting the acquired second report identification and the current response data orderly to generate the return data and sending the return data to the host computer, going back to step S1.

Further, step S1 includes:

when the device receives the command sent by the host computer, determining, by the device, the type of the command according to a command header, if the command header is third data, the type of the command is an enumerating command, executing step S2, if the command header is first data, the type of the command is a setting report command, executing step S3; if the command header is second data, the type of the command is a getting report command, executing step S4.

Further, step S3 is specifically:

searching, by the device, for a corresponding report size according to a first report identification in the setting report command, acquiring data corresponding to the report size from the setting report command according to the report size found by searching, processing the acquired data and generating response data and storing the response data, going back to step S1.

Further, before step S3, the method further includes:

acquiring, by the device, a first byte of data in a data domain of the setting report command to obtain the first report identification.

A device for realizing USB communication, including:

a receiving module, configured to receive a command sent by a host computer;

a first determining module, configured to determine a type of the command, if the command is an enumerating command, trigger a first sending module; if the command is a setting report command, trigger an acquiring and storing module; if the command is a getting report command, trigger a selecting and acquiring module;

the first sending module being configured to return enumerated general information of the device and trigger the receiving module; the general information of the device including a report descriptor, the report descriptor including a plurality of features, each feature including a report identification and a corresponding report size;

the acquiring and storing module being configured to acquire response data according to the setting report command and store the response data and trigger the receiving module;

the selecting and acquiring module being configured to select a corresponding report size according to a size of current response data, acquire a second report identification corresponding to the report size, and generate return data according to the acquired second report identification and the current response data.

a second sending module, configured to send the return data generated by the selecting and acquiring module to the host computer and trigger the receiving module.

Further, the first sending module includes:

a first returning unit configured to: when the receiving module receives a getting status request sent by the host computer, return device status information to the host computer;

a second returning unit configured to: when the receiving module receives a getting device descriptor command sent by the host computer, return corresponding data according to an acquired data size in the getting device descriptor command; the corresponding data returned being response data of a maximum data package size supported by a current signal pathway or a complete device descriptor;

a third returning unit configured to: when the receiving module receives a setting address request sent by the host computer, store a new address in the setting address request and return a confirming response to the host computer;

a fourth returning unit configured to: when the receiving module receives a getting device configuration descriptor command sent by the host computer, send complete configuration information to the host computer;

a fifth returning unit configured to: when the receiving module receives a getting device string descriptor command sent by the host computer, send a descriptor character set to the host computer;

a sixth returning unit configured to: when the receiving module receives a getting human interface device descriptor command sent by the host computer, return a human interface device descriptor to the host computer;

a seven returning unit configured to, when the receiving module receives a getting report descriptor command sent by the host computer, return a report descriptor to the host computer; the report descriptor including a plurality of features, each feature including a report identification and a corresponding report size; and a setting unit configured to: when the receiving module receives a setting configuration command sent by the host computer, configure the device.

Further, the fourth returning unit is specifically configured to:

after the receiving module receives the getting device configuration descriptor command every time, send corresponding configuration information to the host computer.

Further, the selecting and acquiring module is specifically configured to:

select a report size which is greater than and most approximate to the current response data according to the current response data, acquire a second feature including the report size in the report descriptor, acquire a second report identification in the second feature, connect the acquired second report identification and the current response data orderly to generate the return data.

Further, the first determining module is specifically configured to:

determine the type of the command according to a command header when the receiving module receives the command sent by the host computer, if the command header is third data, the type of the command is an enumerating command, trigger the first sending module; if the command header is first data, the type of the command is a setting report command, trigger the acquiring and storing module; if the command header is second data, the type of the command is a getting report command, trigger the selecting and acquiring module.

Further, the acquiring and selecting module is specifically configured to:

search for a corresponding report size according to a first report identification in the setting report command, acquire data corresponding to the report size from the setting report command according to the report size found by searching, process the acquired data and generate response data and store the response data, trigger the receiving module.

Further, the device further includes:

an acquiring module configured to acquire a first byte of data in a data domain of the setting report command to obtain the first report identification.

Comparing with the prior art, the present disclosure has following advantages:

the technical solutions of the present disclosure are applicable to a data communication process between a host computer and a device. In an enumerating process, a size of interacting data between the host computer and the device is not set to be fixed, i.e. many features are set for a reporting describer, and report sizes of respective features are different from each other. During the communication, a corresponding report size is selected as required and a corresponding report indentation is sent to the other side. Without package dividing operations, the interacting data can be sent in a single transmission regardless the size of the interacting data, thus making data interaction more flexible and increasing a communication speed.

DESCRIPTION OF EMBODIMENTS

The technical solutions of the embodiments of the present disclosure are described clearly and completely in conjunction with the accompanying drawings in the below. Apparently, the described embodiments are merely part but not all of the embodiments of the present disclosure. Based on the described embodiments of the present disclosure, other embodiments acquired by those skilled in the art without paying any creative work will fall within the protection scope of the present disclosure.

Embodiment 1

Figure 1:
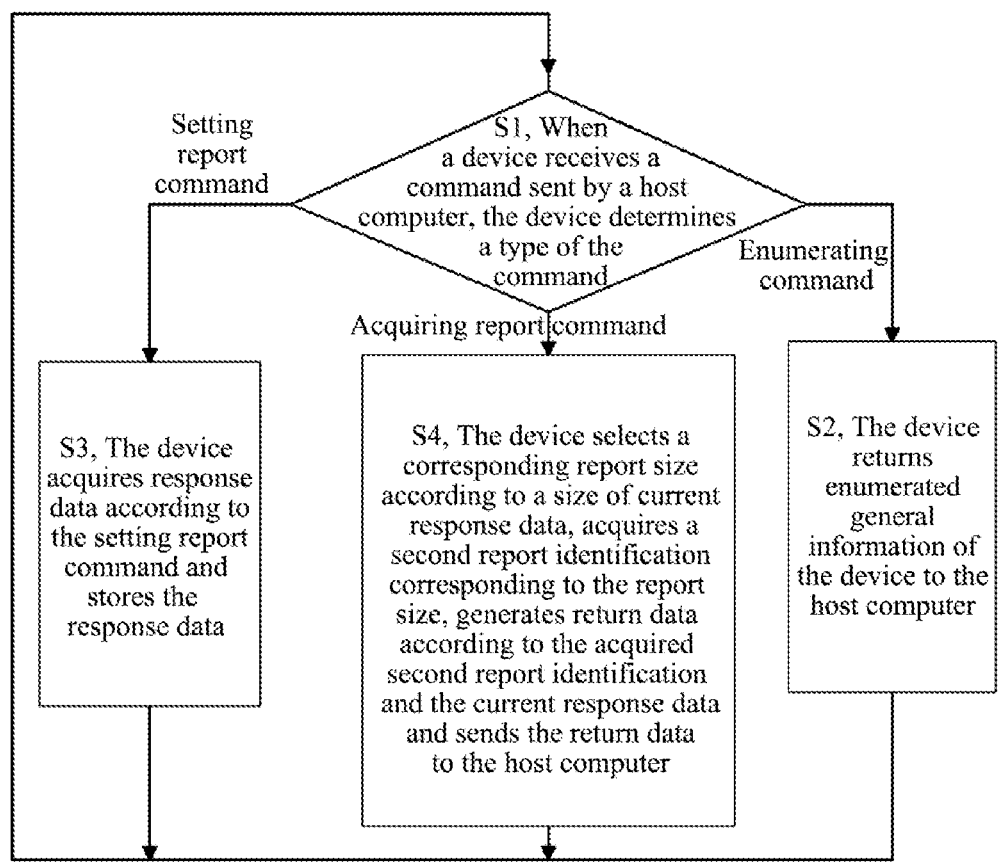
FIG. 1 presents a flowchart of a method for realizing USB communication provided by Embodiment 1 of the present disclosure.

Embodiment 1 of the present disclosure provides a method for realizing USB communication. As shown in FIG. 1, the method includes:

Step S1, when a device receives a command sent by a host computer, the device determines a type of the command, if the command is an enumerating command, execute Step S2, if the command is a setting report command, execute Step S3; if the command is a getting report command, execute Step S4.

Optionally, Step S1 includes: when the device receives the command sent by the host computer, the device determines the type of the command according to a command header, if the command header is third data, the type of the command is an enumerating command, execute Step S2, if the command header is first data, the type of the command is a setting report command, execute Step S3; if the command header is second data, the type of the command is a getting report command, execute Step S4.

Step S2, the device returns enumerated general information of the device to the host computer, go back to Step S1.

In the embodiment, the general information of the device includes a report descriptor, the report descriptor includes a plurality of features, each feature includes a report identification and a corresponding report size.

Step S3, the device acquires response data according to the setting report command and stores the response data, go back to Step S1.

Optionally, Step S3 specifically includes: the device searches for a corresponding report size according to a first report identification in the setting report command, acquires data corresponding to the report size from the setting report command according to the report size found by searching, processes the acquired data and generates response data and stores the response data, go back to Step S1.

Preferably, in the embodiment, before Step S3, the method further includes: the device acquires a first byte of data in a data domain of the setting report command to obtain the first report identification.

Step S4, the device selects a corresponding report size according to a size of current response data, acquires a second report identification corresponding to the report size, generates return data according to the acquired second report identification and the current response data and sends the return data to the host computer, go back to Step S1.

Specifically, in the embodiment, Step S4 includes: the device selects a report size which is greater than and most approximate to the current response data according to the current response data, acquires a second feature including the report size in the report descriptor, acquires a second report identification in the second feature, connects the acquired second report identification and the current response data orderly to generate the return data and sends the return data to the host computer, go back to Step S1.

In the embodiment, Step S2 includes:

when the device receives a getting status request sent by the host computer, the device returns device status information to the host computer.

Optionally, the device status information includes reactivating status information.

When the device receives a getting device descriptor command sent by the host computer, the device returns corresponding data according to an acquired data size in the getting device descriptor command.

Specifically, in the embodiment, the corresponding data returned is response data of a maximum data package size supported by a current signal pathway or a complete device descriptor.

When the device receives a setting address request sent by the host computer, the device stores a new address in the setting address request and returns a confirming response to the host computer.

When the device receives a getting device configuration descriptor command sent by the host computer, the device sends complete configuration information to the host computer.

In the embodiment, when the device receives a getting device configuration descriptor command sent by the host computer, the device sends complete configuration information to the host computer includes: after the device receives the getting device configuration descriptor command every time, the device sends corresponding configuration information to the host computer.

When the device receives a getting device string descriptor command sent by the host computer, the device sends a descriptor character set to the host computer.

When the device receives a getting human interface device descriptor command from the host computer, the device returns a human interface device descriptor to the host computer.

When the device receives a getting report descriptor command sent by the host computer, the device returns a report descriptor to the host computer; where the report descriptor includes a plurality of features, each feature includes a report identification and a corresponding report size.

When the device receives a setting configuration command sent by the host computer, the device configures the device per se.

Embodiment 2

Figure 2:
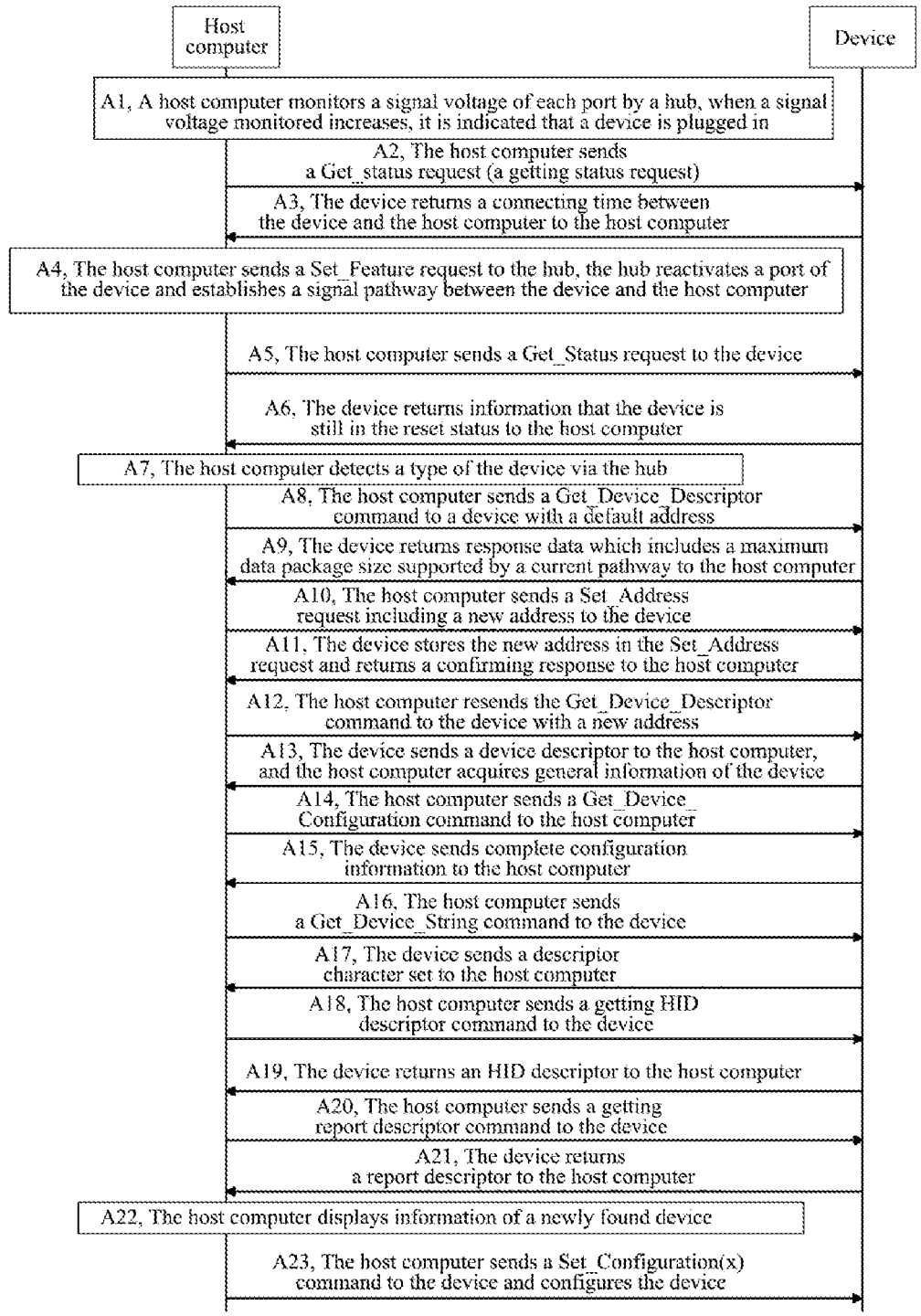
FIG. 2 and FIG. 3 present a flowchart of a method for realizing USB communication provided by Embodiment 2 of the present disclosure.

Embodiment 2 of the present disclosure provides a method for realizing USB communication, which includes an enumerating process and a data transmission process. As shown in FIG. 2, the enumerating process includes:

Step A1, a host computer monitors a signal voltage of each port by a hub, when a signal voltage monitored increases, it is indicated that a device is plugged in, execute Step A2.

Each of two signal lines at ports of the hub of the host computer has a pull-down resistor of 15 kΩ, each device has a pull-up resistor of 1.5 kΩ at D+. When the host computer and the device are connected via a USB line, the pull-up resistor of the device makes the signal voltage increased, and the hub will detect that the device is plugged in.

Step A2, the host computer sends a Get_status request (a getting status request).

In the embodiment, the hub reports an event that a device has been plugged in by interrupting transmission, the host computer sends a Get_status request (a getting status request) to the device via the hub.

Step A3, the device returns a connecting time between the device and the host computer to the host computer.

Step A4, the host computer sends a Set_Feature request (a setting feature request) to the hub, the hub reactivates a port of the device and establishes a signal pathway between the device and the host computer.

In the embodiment, the host computer sends to the hub a Set_Feature request (a setting feature request) for requesting the hub to reactivate the port of the device, so as to make the USB data line of the device be in reset status for at least 10 ms, and then establishes the signal pathway between the device and the host computer.

Step A5, the host computer sends a Get_Status request (a getting status request) to the device.

Step A6, the device returns information that the device is still in the reset status to the host computer.

In the embodiment, when the hub releases the reset status, the device is in default status; the device is ready to control transmission (transfer) by a default process response of Endpoint 0, i.e., the device starts to communicate with the host computer by using a default address 0x00.

Step A7, the host computer detects a type of the device via the hub.

Specifically, the host computer detects whether the device is a low-speed device or a full-speed device by checking which one of the signal lines, i.e. D+ or D−, has a higher voltage when the signal lines are in free status. The full speed device and the high speed device have pull-up resistors at D+, the low speed device has a pull-up resistor at D−.

Step A8, the host computer sends a Get_Device_Descriptor command (a getting device descriptor command) to a device with a default address.

Step A9, the device returns response data which includes a maximum data package size supported by a current pathway to the host computer.

Specifically, in the embodiment, the host computer sends a Get_Device_Descriptor command (a getting device descriptor command) to address 0 (which corresponds to a default address 0x00), acquires the maximum data package size supported by a default control pipe and waits for a response of a USB device in a preset time; when the host computer receives the response of the device, the host computer acquires the first 8 bytes of data to obtain the maximum package size.

Step A10, the host computer sends a Set_Address request (a setting address request) including a new address to the device.

Step A11, the device stores the new address in the Set_Address request (the setting address request) and returns a confirming response to the host computer.

Specifically, in the embodiment, the host computer sends a Set_Address request (a setting address request) to the device to allocate a unique address to the device; the device reads the Set_Address request (the setting address request) and returns a confirming response to the host computer and stores the new address.

Step A12, the host computer resends the Get_Device_Descriptor command (the getting device descriptor command) to the device with a new address.

Step A13, the device sends a device descriptor to the host computer, and the host computer acquires general information of the device.

For example, the general information of the device includes a VID (vendor identification), a PID (product identification), etc., all values of bDeviceClass (a type of a device), bDeviceSubClass (i.e. a sub-type of the device), bDeviceProtocol (a protocol of the device) in the returned device descriptor are zero.

Step A14, the host computer sends a Get_Device-Configuration command (a getting device configuration descriptor command) to the host computer.

Specifically, the host computer sends, in a recurrent manner, a Get_Device_Configuration command (a getting device configuration descriptor command) to the device to read all configuration information of the device; the value of bInterFaceClass (a type of an interface) in an interface descriptor of the configuration information is 0x03, which indicates that the device is an HID device, i.e. a human interface device.

Step A15, the device sends complete configuration information to the host computer.

Step A16, the host computer sends a Get_Device_String command (a getting device string descriptor command) to the device.

Step A17, the device sends a descriptor character set to the host computer.

Specially, the descriptor character set includes information such as a manufacturer, descriptions and a type of a product, and the like.

Step A18, the host computer sends a getting HID (human interface device) descriptor command to the device.

Step A19, the device returns an HID descriptor to the host computer.

In this case, the HID (human interface device) descriptor indicates that a report descriptor is required to be returned.

Step A20, the host computer sends a getting report descriptor command to the device.

Step A21, the device returns a report descriptor to the host computer.

Specifically, the report descriptor includes a plurality of features, the features are distinguished from each other by ReportID (a report identification); ReportSizes (report sizes) of respective features are different; ReportSize (a report size) represents a size of data which can be sent and a size of response which can be received, includes a minimum length (0x01) and a maximum length (0xFFFF), i.e., different data lengths, and has a corresponding ReportID (a report identification).

For example, the report descriptor of the embodiment is an HID (human interface device), the content of the report descriptor is as follows:

```
{
  0x06,0xA0,0xFF,    // Usage Page (vendor defined) ($FFA0) global
  0x09,0xA2,         // Usage (vendor defined) ($01) local
  0xA1,0x01,         // Collection (Application)
  0x15,0x00,         // logical minimum
  0x26,0xff,0x00,    // logical maximum
  0x75,0x08,         // report count
  0x85,0x01,0x09,0x01,0x95,0x07,0xb1,0x82,//report ID, Usage, Report size, Feature
  0x85,0x03,0x09,0x01,0x95,0x17,0xb1,0x82, //report ID, Usage, Report size, Feature
  0x85,0x04,0x09,0x01,0x95,0x1F,0xb1,0x82, //report ID, Usage, Report size, Feature
```

```
    0x85,0x05,0x09,0x01,0x95,0x27,0xb1,0x82, //report ID, Usage,
Report size, Feature
    0x85,0x06,0x09,0x01,0x95,0x2F,0xb1,0x82, //report ID, Usage,
Report size, Feature
    0x85,0x07,0x09,0x01,0x95,0x37,0xb1,0x82, //report ID, Usage,
Report size, Feature
    0x85,0x08,0x09,0x01,0x95,0x3F,0xb1,0x82, //report ID, Usage,
Report size, Feature
    0x85,0x09,0x09,0x01,0x95,0x47,0xb1,0x82, //report ID, Usage,
Report size, Feature
    0x85,0x0a,0x09,0x01,0x95,0x4F,0xb1,0x82, //report ID, Usage,
Report size, Feature
    0x85,0x0b,0x09,0x01,0x95,0x57,0xb1,0x82, //report ID, Usage,
Report size, Feature
    0x85,0x0c,0x09,0x01,0x95,0x5F,0xb1,0x82, //report ID, Usage,
Report size, Feature
    0x85,0x0d,0x09,0x01,0x95,0x67,0xb1,0x82, //report ID, Usage,
Report size, Feature
    0x85,0x0e,0x09,0x01,0x95,0x6F,0xb1,0x82, //report ID, Usage,
Report size, Feature
    0x85,0x0f,0x09,0x01,0x95,0x77,0xb1,0x82, //report ID, Usage,
Report size, Feature
    0x85,0x10,0x09,0x01,0x95,0x7F,0xb1,0x82, //report ID, Usage,
Report size, Feature
    0x85,0x11,0x09,0x01,0x95,0x87,0xb1,0x82, //report ID, Usage,
Report size, Feature
    0x85,0x12,0x09,0x01,0x95,0x8F,0xb1,0x82, //report ID, Usage,
Report size, Feature
    0x85,0x13,0x09,0x01,0x95,0x97,0xb1,0x82, //report ID, Usage,
Report size, Feature
    0x85,0x14,0x09,0x01,0x95,0x9F,0xb1,0x82,
    0x85,0x15,0x09,0x01,0x95,0xa7,0xb1,0x82,
    0x85,0x16,0x09,0x01,0x95,0xaf,0xb1,0x82,
    0x85,0x17,0x09,0x01,0x95,0xb7,0xb1,0x82,
    0x85,0x18,0x09,0x01,0x95,0xbf,0xb1,0x82,
    0x85,0x19,0x09,0x01,0x95,0xc7,0xb1,0x82,
    0x85,0x1a,0x09,0x01,0x95,0xcf,0xb1,0x82,
    0x85,0x1b,0x09,0x01,0x95,0xd7,0xb1,0x82,
    0x85,0x1c,0x09,0x01,0x95,0xdf,0xb1,0x82,
    0x85,0x1d,0x09,0x01,0x95,0xe7,0xb1,0x82,
    0x85,0x1e,0x09,0x01,0x95,0xef,0xb1,0x82,
    0x85,0x1f,0x09,0x01,0x95,0xF7,0xb1,0x82,
    0x85,0x20,0x09,0x01,0x95,0xff,0xb1,0x82,
    0x85,0x21,0x09,0x01,0x96,0x07,0x01,0xb1,0x82, //report ID, Usage,
Report size, Feature
    0x85,0x22,0x09,0x01,0x96,0x0f,0x01,0xb1,0x82, //report ID, Usage,
Report size, Feature
    0x85,0x23,0x09,0x01,0x96,0x4f,0x01,0xb1,0x82,
    0x85,0x24,0x09,0x01,0x96,0x8f,0x01,0xb1,0x82,
    0x85,0x25,0x09,0x01,0x96,0xCf,0x01,0xb1,0x82,
    0x85,0x26,0x09,0x01,0x96,0x0f,0x02,0xb1,0x82,
    0x85,0x27,0x09,0x01,0x96,0x8f,0x02,0xb1,0x82,
    0x85,0x28,0x09,0x01,0x96,0x0f,0x03,0xb1,0x82,
    0x85,0x29,0x09,0x01,0x96,0x8f,0x03,0xb1,0x82,
    0x85,0x2A,0x09,0x01,0x96,0x0f,0x04,0xb1,0x82,
    0x85,0x2B,0x09,0x01,0x96,0x0f,0x05,0xb1,0x82,
    0x85,0x2C,0x09,0x01,0x96,0x0f,0x06,0xb1,0x82,
    0x85,0x2D,0x09,0x01,0x96,0x0f,0x07,0xb1,0x82,
    0x85,0x2E,0x09,0x01,0x96,0x0f,0x08,0xb1,0x82,
    0x85,0x2F,0x09,0x01,0x96,0x0f,0x0A,0xb1,0x82,
    0x85,0x30,0x09,0x01,0x96,0x0f,0x0C,0xb1,0x82,
    0x85,0x31,0x09,0x01,0x96,0x0f,0x0E,0xb1,0x82,
    0x85,0x32,0x09,0x01,0x96,0xFF,0x0F,0xb1,0x82,
    0xC0// Application Collection End
};
```

In the above report descriptor, the value of the report identification is 0x01-0x32. In this case, the report identification is 0x01, the size of data for one communication is 0x07, i.e. 7 bytes; the report identification is 0x2E, the size of data for one communication is 0x080F . . . .

Step A22, the host computer displays information of a newly found device.

Specifically, the host computer pops up a window displaying information of the newly found device, which includes: a manufacturer, descriptions and a type of a product, etc.

Step A23, the host computer sends a Set_Configuration(x) command (a setting configuration command) to the device and configures the device.

Specifically, in the embodiment, after loading a USB device driver, the host computer sends a Set_Configuration (x) command (a setting configuration command), in which x indicates a non-zero configuration value, to request configuration of the device, if the configuration is successful, the USB device enters in "configuration" status and can perform data transmission with a client software.

Figure 3:
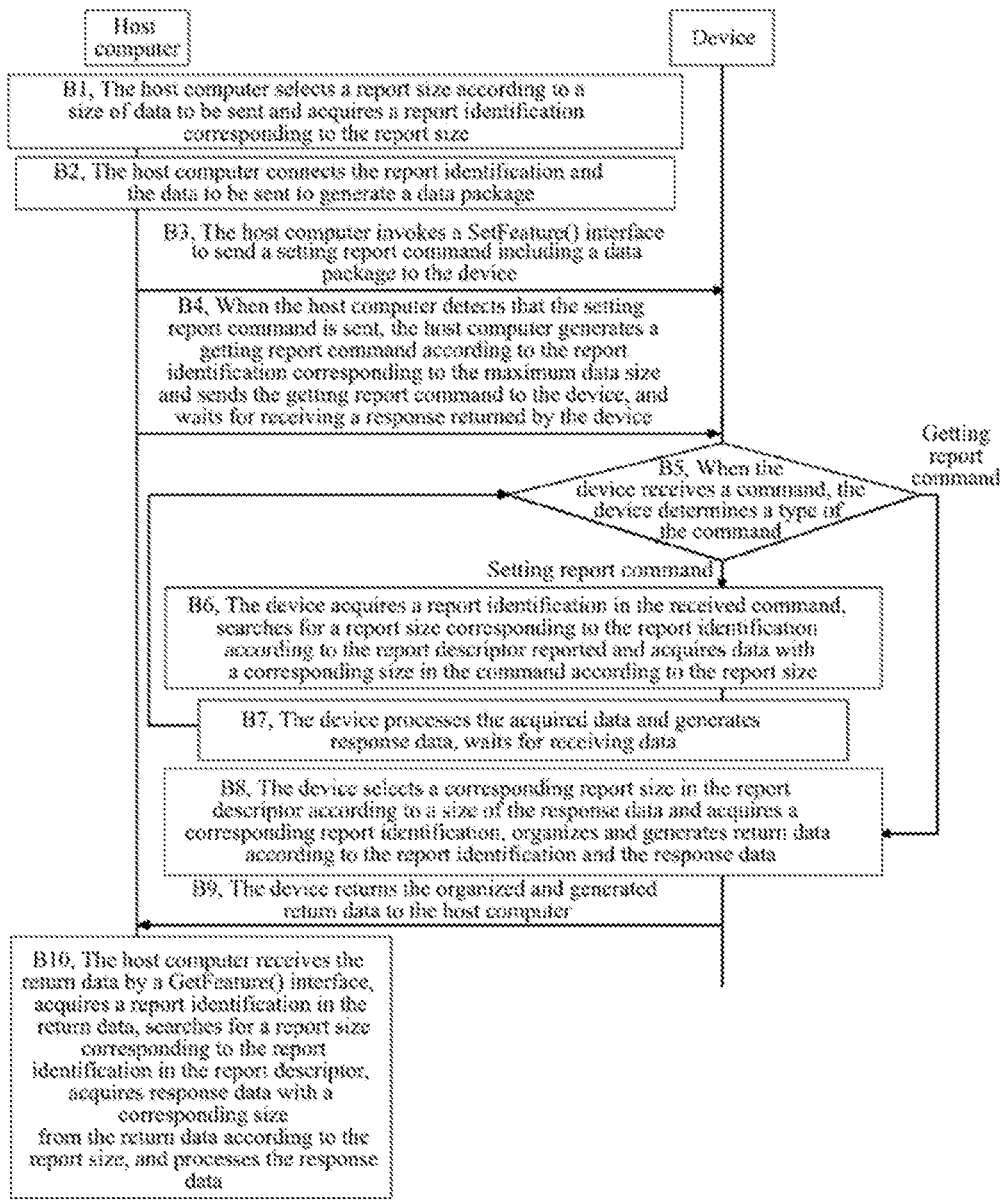

As shown in FIG. 3, a data transmission process includes:

Step B1, the host computer selects a report size according to a size of data to be sent and acquires a report identification corresponding to the report size.

Specifically, the selected size of the data to be sent is a report size which is greater than and most approximate to the size of the data to be sent.

For example, the size of the data to be sent is 512, the content is specifically:
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
5555555555555555
5555555555555555555555555555555555555555-
55555555555555555.

A format of the data to be sent is: 00 D6 00 00 00 02 00|data to be updated; a total size of the data to be sent is: 512+7=519 bytes; the report size selected according to the total size of the data to be sent should be the minimum size which is greater than 519; in the embodiment, the report size found by searching is 0x020F, i.e., 527, the corresponding report identification is 0x26.

Step B2, the host computer connects the report identification and the data to be sent to generate a data package.

Specifically, in the embodiment, the host computer adds the report identification before the data to be sent; if the size of data after adding the report identification is less than the report size corresponding to the report identification, the host computer adds data, i.e., 00 at the end of the data to be sent to make the size of the data to be sent reach the report size. In the embodiment, the data after adding is:

26 00 D6 00 00 00 02 00
5555555555555555555555555555555555555555-
5555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555 0000000000000000.

Step B3, the host computer invokes a SetFeature( ) interface to send a setting report command including a data package to the device.

For example, in the embodiment, the setting report command sent by invoking the SetFeature interface is:
21 09 26 03 00 00 0F 02
26 00 D6 00 00 00 02 00
5555555555555555555555555555555555555555-
5555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555
5555555555555555555555555555555555555555-
5555555555555555555 0000000000000000.

Step B4, when the host computer detects that the setting report command is sent, the host computer generates a getting report command according to the report identification corresponding to the maximum data size and sends the getting report command to the device, and waits for receiving a response returned by the device.

For example, the getting report command in the embodiment is: A1 01 32 03 00 00 FF 0F.

Step B5, when the device receives a command, the device determines a type of the command, if the command is a setting report command, execute Step B6; if the command is a getting report command, execute Step B8.

Specifically, in the embodiment, the device determines a command header (a header of the command), if the header is 21 09, the type of the command is a setting report command, if the header is A1 01, the type of the command is a getting report command.

Step B6, the device acquires a report identification in the received command, searches for a report size corresponding to the report identification according to the report descriptor reported and acquires data with a corresponding size in the command according to the report size.

Step B7, the device processes the acquired data and generates response data, waits for receiving data; go back to Step B5.

Step B8, the device selects a corresponding report size in the report descriptor according to a size of the response data and acquires a corresponding report identification, organizes and generates return data according to the report identification and the response data.

Specifically, the device selects a report size with a value which is greater than the size of the response data and is most approximate to the size of the response data.

For example, the response data in the embodiment is 00 02 90 00, i.e., the size of the response data is 4 bytes, hence, the report identification acquired may be 0x01, the organized and generated return data is thus: 01 00 02 90 00 00 00 00.

Step B9, the device returns the organized and generated return data to the host computer.

For example, the return data in the embodiment is: 01 00 02 90 00 00 00 00.

Step B10, the host computer receives the return data by a GetFeature( ) interface, acquires a report identification in the return data, searches for a report size corresponding to the report identification in the report descriptor, acquires response data with a corresponding size from the return data according to the report size, and processes the response data.

Embodiment 3

Figure 4:
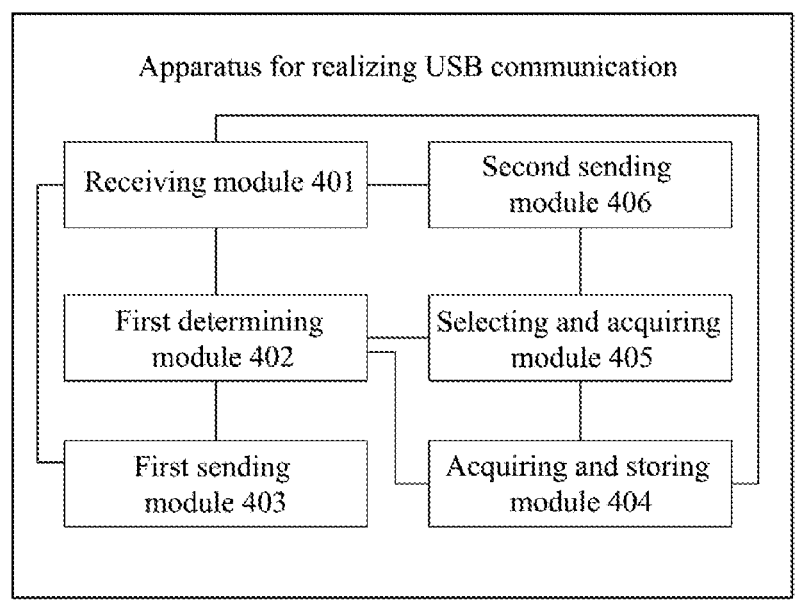
FIG. 4 presents a block diagram of an apparatus for realizing USB communication provided by Embodiment 3 of the present disclosure.

Embodiment 3 of the present disclosure provides an apparatus for realizing USB communication. As shown in FIG. 4, the device includes:

a receiving module 401 configured to receive a command sent by a host computer;

a first determining module 402 configured to determine a type of the command received by the receiving module 401, if the command is an enumerating command, trigger a first sending module 403; if the command is a setting report command, trigger an acquiring and storing module 404; if the command is a getting report command, trigger a selecting and acquiring module 405;

in the embodiment, the first determining module 402 is specifically configured to configured to determine the type of the command according to a command header when the receiving module 401 receives the command sent by the host computer, if the command header is third data, the type of the command is an enumerating command, trigger the first sending module 403; if the command header is first data, the type of the command is a setting report command, trigger the acquiring and storing module 404; if the command header is second data, the type of the command is a getting report command, trigger the selecting and acquiring module 405;

the first sending module 403 is configured to return enumerated general information of the device and trigger the receiving module 401; the general information of the device including a report descriptor, the report descriptor including a plurality of features, each feature including a report identification and a corresponding report size;

the acquiring and storing module 404 is configured to acquire response data according to the setting report command and store the response data, and trigger the receiving module 401;

in the embodiment, the acquiring and storing module 404 is specifically configured to search for a corresponding report size according to a first report identification in the setting report command, acquire data corresponding to the report size from the setting report command according to the report size found by searching, process the acquired data and generate response data and store the response data, trigger the receiving module 401; optionally, the device of the embodiment further includes: an acquiring module configured to acquire a first byte of data in a data domain of the setting report command to obtain the first report identification, and trigger the acquiring and storing module 404;

the selecting and acquiring module 405 is configured to select a corresponding report size according to a size of current response data, acquire a second report identification corresponding to the report size, and generate return data according to the acquired second report identification and the current response data;

in the embodiment, the selecting and acquiring module 405 is specifically configured to select a report size which is greater than and most approximate to the current response data according to the current response data, acquire a second feature including the report size in the report descriptor, acquire a second report identification in the second feature, connect the acquired second report identification and the current response data orderly to generate the return data;

a second sending module 406 configured to send the return data generated by the selecting and acquiring module 405 to the host computer and trigger the receiving module 401.

Specifically, in the embodiment, the first sending module 403 includes:

a first returning unit configured to: when the receiving module 401 receives a getting status request sent by the host computer, return device status information to the host computer;

a second returning unit configured to: when the receiving module 401 receives a getting device descriptor command sent by the host computer, return corresponding data according to an acquired data size in the getting device descriptor command; the corresponding data returned being response data of a maximum data package size supported by a current signal pathway or a complete device descriptor;

a third returning unit configured to: when the receiving module 401 receives a setting address request sent by the host computer, store a new address in the setting address request and return a confirming response to the host computer;

a fourth returning unit configured to: when the receiving module 401 receives a getting device configuration descriptor command sent by the host computer, send complete configuration information to the host computer;

in the embodiment, the fourth returning unit specifically is configured to: after the receiving module 401 receives the getting device configuration descriptor command every time, send corresponding configuration information to the host computer;

a fifth returning unit configured to, when the receiving module 401 receives a getting device string descriptor command sent by the host computer, send a descriptor character set to the host computer;

a sixth returning unit configured to: when the receiving module 401 receives a getting human interface device descriptor command sent by the host computer, return a human interface device descriptor to the host computer;

a seven returning unit configured to: when the receiving module 401 receives a getting report descriptor command sent by the host computer, return a report descriptor to the host computer; the report descriptor including a plurality of features, each feature including a report identification and a corresponding report size;

a setting unit configured to: when the receiving module 401 receives a setting configuration command sent by the host computer, configure the device.

The descriptions above are only preferred embodiments of the present disclosure, but the protection scope of the present disclosure is not limited to this, and any changes or replacements that can be easily thought of within the technical scope disclosed by the present disclosure by those familiar with the technical field shall fall within the protection scope of the present disclosure. Therefore, the protection scope of the present disclosure shall be subject to the protection scope of the claim.

What is claimed is:

1. A method for realizing Universal Serial Bus (USB) communication, comprising:
    step S1, when a device receives a command sent by a host computer, determining, by the device, a type of the command, if the command is an enumerating command, executing step S2, if the command is a setting report command, executing step S3; if the command is a getting report command, executing step S4;
    step S2, returning, by the device, enumerated general information of the device, going back to step S1; the general information of the device comprising a report descriptor, the report descriptor comprising a plurality of features, each feature comprising a report identification and a corresponding report size;
    step S3, acquiring, by the device, response data according to the setting report command and storing the response data, going back to step S1; and
    step S4, selecting, by the device, a corresponding report size according to a size of current response data, acquiring a second report identification corresponding to the report size, generating return data according to the acquired second report identification and the current response data and sending the return data to the host computer, going back to step S1.

2. The method of claim 1, wherein step S2 comprises:
    when the device receives a getting status request sent by the host computer, returning, by the device, device status information to the host computer;
    when the device receives a getting device descriptor command sent by the host computer, returning, by the device, corresponding data according to an acquired data size in the getting device descriptor command; the corresponding data returned being response data of a maximum data package size supported by a current signal pathway or a complete device descriptor;

when the device receives a setting address request sent by the host computer, storing, by the device, a new address in the setting address request and returning a confirming response to the host computer;

when the device receives a getting device configuration descriptor command sent by the host computer, sending, by the device, complete configuration information to the host computer;

when the device receives a getting device string descriptor command sent by the host computer, sending, by the device, a descriptor character set to the host computer;

when the device receives a getting human interface device descriptor command from the host computer, returning, by the device, a human interface device descriptor to the host computer;

when the device receives a getting report descriptor command sent by the host computer, returning, by the device, a report descriptor to the host computer; the report descriptor comprising a plurality of features, each feature comprising a report identification and a corresponding report size; and when the device receives a setting configuration command sent by the host computer, configuring, by the device, the device.

3. The method of claim 2, wherein the device status information comprises reactivating status information.

4. The method of claim 2, wherein when the device receives a getting device configuration descriptor command sent by the host computer, sending, by the device, complete configuration information to the host computer comprises:

after the device receives the getting device configuration descriptor command every time, sending, by the device, corresponding configuration information to the host computer.

5. The method of claim 1, wherein step S4 comprises:

selecting, by the device, a report size which is greater than and most approximate to the current response data according to the current response data, acquiring a second feature comprising the report size in the report descriptor, acquiring a second report identification in the second feature, connecting the acquired second report identification and the current response data orderly to generate the return data and sending the return data to the host computer, going back to step S1.

6. The method of claim 1, wherein step S1 comprises:

when the device receives the command sent by the host computer, determining, by the device, the type of the command according to a command header, if the command header is third data, the type of the command is an enumerating command, executing step S2, if the command header is first data, the type of the command is a setting report command, executing step S3; if the command header is second data, the type of the command is a getting report command, executing step S4.

7. The method of claim 1, wherein step S3 specifically comprises:

searching, by the device, for a corresponding report size according to a first report identification in the setting report command, acquiring data corresponding to the report size from the setting report command according to the report size found by searching, processing the acquired data and generating response data and storing the response data, going back to step S1.

8. The method of claim 7, wherein before step S3, the method further comprises:

acquiring, by the device, a first byte of data in a data domain of the setting report command to obtain the first report identification.

9. A device for realizing Universal Serial Bus (USB) communication, comprising:

a memory;

a processor; and a computer program;

wherein the computer program is stored in the memory and configured to be executed by the processor to enable the processor to:

receive a command sent by a host computer;

determine a type of the command;

if the command is an enumerating command, return enumerated general information of the device; the general information of the device comprising a report descriptor, the report descriptor comprising a plurality of features, each feature comprising a report identification and a corresponding report size;

if the command is a setting report command, acquire response data according to the setting report command and store the response data;

if the command is a getting report command, select a corresponding report size according to a size of current response data, acquire a second report identification corresponding to the report size, and generate return data according to the acquired second report identification and the current response data; and send the return data generated to the host computer.

10. The device of claim 9, wherein the processor is further enabled to:

when receiving a getting status request sent by the host computer, return device status information to the host computer;

when receiving a getting device descriptor command sent by the host computer, return corresponding data according to an acquired data size in the getting device descriptor command; the corresponding data returned being response data of a maximum data package size supported by a current signal pathway or a complete device descriptor;

when receiving a setting address request sent by the host computer, store a new address in the setting address request and return a confirming response to the host computer;

when receiving a getting device configuration descriptor command sent by the host computer, send complete configuration information to the host computer;

when receiving a getting device string descriptor command sent by the host computer, send a descriptor character set to the host computer;

when receiving a getting human interface device descriptor command sent by the host computer, return a human interface device descriptor to the host computer;

when receiving a getting report descriptor command sent by the host computer, return a report descriptor to the host computer; the report descriptor comprising a plurality of features, each feature comprising a report identification and a corresponding report size; and when receiving a setting configuration command sent by the host computer, configure the device.

11. The device of claim 10, wherein the device status information comprises reactivating status information.

12. The device of claim 10, wherein the processor is further enabled to:

after receiving the getting device configuration descriptor command every time, send corresponding configuration information to the host computer.

13. The device of claim 9, wherein the processor is further enabled to:

select a report size which is greater than and most approximate to the current response data according to the current response data, acquire a second feature comprising the report size in the report descriptor, acquire a second report identification in the second feature, connect the acquired second report identification and the current response data orderly to generate the return data.

14. The device of claim 9, wherein the processor is further enabled to:

determine the type of the command according to a command header when receiving the command sent by the host computer, if the command header is third data, the type of the command is an enumerating command, execute the step of returning the enumerated general information of the device; if the command header is first data, the type of the command is a setting report command, execute the step of acquiring the response data and storing the response data; if the command header is second data, the type of the command is a getting report command, execute the step of selecting the corresponding report size, acquiring the second report identification corresponding to the report size, and generating the return data.

15. The device of claim 9, wherein the processor is further enabled to:

search for a corresponding report size according to a first report identification in the setting report command, acquire data corresponding to the report size from the setting report command according to the report size found by searching, process the acquired data and generate response data and store the response data.

16. The device of claim 15, wherein the processor is further enabled to:

acquire a first byte of data in a data domain of the setting report command to obtain the first report identification.

* * * * *